March 31, 1959 — R. T. CORNELIUS — 2,879,801
BEVERAGE MIXING AND DISPENSING DEVICES
Filed Aug. 17, 1954 — 4 Sheets-Sheet 1

INVENTOR
RICHARD T. CORNELIUS
Caswell & Lagaard
ATTORNEYS

INVENTOR
RICHARD T. CORNELIUS
Caswell & Lagaard
ATTORNEYS

March 31, 1959 R. T. CORNELIUS 2,879,801
BEVERAGE MIXING AND DISPENSING DEVICES
Filed Aug. 17, 1954 4 Sheets-Sheet 3

INVENTOR
RICHARD T. CORNELIUS
Caswell & Lagaard
ATTORNEYS

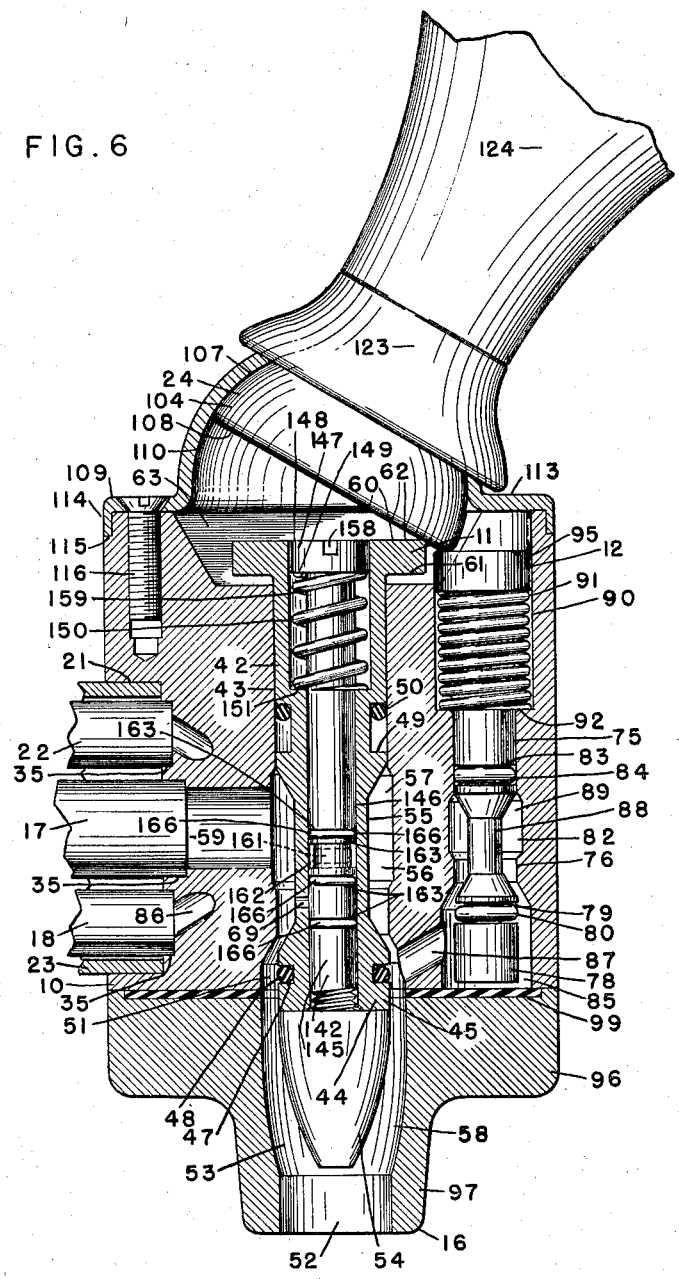

United States Patent Office 2,879,801
Patented Mar. 31, 1959

2,879,801

BEVERAGE MIXING AND DISPENSING DEVICES

Richard T. Cornelius, Minneapolis, Minn.

Application August 17, 1954, Serial No. 450,455

4 Claims. (Cl. 137—636.2)

The herein disclosed invention relates to beverage mixing and dispensing devices and particularly to a device having a body in which are disposed an inner main valve for controlling the flow of carbonated water, including a valve stem and valve tip, outer syrup valves encircling the inner valve for controlling the flow of beverage flavoring syrups or concentrates, compression coil springs closing the valve members of said main valve and syrup valves, and passageways for the flow of carbonated water and beverage flavoring syrup or concentrates therethrough and to a discharge nozzle, said dispensing device also having a lever provided with a handle and a head, said head being adapted to actuate simultaneously the main valve and one of the syrup valves, said handle, lever, and head being movable in different directions from a centered position in which both the carbonated water and the syrup valves are closed to positions in which the head opens the carbonated water valve and one of the syrup valves to dispense a beverage of the flavor selected.

An object of the invention resides in providing a construction whereby carbonated water alone may be selected and separately dispensed from the device.

Another object of the invention resides in providing a main carbonated water valve directing carbonated water into the discharge nozzle and a by-pass valve also directing the carbonated water into the nozzle.

A further object of the invention is to provide valve operating means for said by-pass valve associated with said handle and adapted to be actuated independently of the movement of said handle to dispense carbonated water alone from said device.

A further object of the invention resides in constructing said by-pass valve as a slide valve having a valve member disposed coaxially within said main valve member to permit the flow of carbonated water through the valve member of the main valve when said main valve is closed.

Another object of the invention is to provide a construction wherein the valve tip is detachable from the by-pass valve member to permit removal of the same and in which said valve tip is adapted to retain the by-pass valve member within the main valve member when the parts are assembled.

A further object of the invention resides in disposing the coil compression spring associated with the main valve in a spring recess in the body, said spring recess having an axis parallel with the axis of said main valve and offset therefrom, thereby permitting the use of a main valve member of sufficient diameter to contain the slide valve.

A further object of the invention resides in providing the main valve with a sliding spring seat slidable in said spring recess and against which the coil compression spring associated with the main valve is seated, said spring seat engaging a shoulder on the main valve member to urge the main valve member to a closed position.

Other objects of the invention reside in the novel combination and arrangement of parts and in the details of construction hereinafter illustrated and/or described.

In the drawings:

Fig. 6 is a fragmentary elevational sectional view taken on line 6—6 of Fig. 4.

Figure 1:
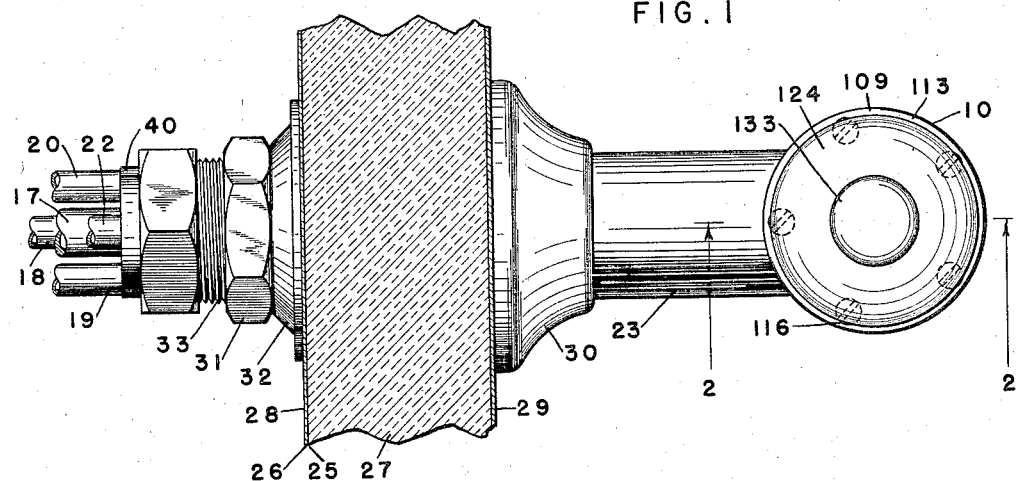
Fig. 1 is a plan view of a beverage dispensing device embodying the invention.

The construction shown in the drawings is a beverage mixing and dispensing device which includes a body, preferably cylindrical in form, disposed with its axis vertical and having a carbonated water feed tube and syrup feed tubes extending outwardly thereof for connection with reservoirs containing these beverage ingredients. Disposed within said body in a substantially central location with its axis parallel to the axis of said body is a main valve for controlling the flow of carbonated water, said main valve including a main valve bore and a main valve seat formed in said body. A main valve member having a valve stem and valve head is slidably received within said main valve bore. A compression coil spring is received within a cylindrical spring recess disposed adjacent the main valve bore with its axis parallel to the axis of the main valve bore. Disposed over the end of said compression spring is a sliding spring seat having a socket formed therein adapted to receive the end of said compression coil spring and having a head adapted to engage a flange formed on the upper end of the main valve stem. Encircling the main valve in the body are syrup valves for controlling the flow of flavoring syrup, said syrup valves being disposed within said body with their axis also parallel to the axis of the body. Compression coil springs encircle the valve members of said syrup valves and operate to close said valves. A lever having a handle at one end and a hemispherical head at the other end is socketed in a cap mounted on the body, said head having a planiform face disposed normal to the lever to form a cam adapted to operate the various valves of the dispensing device. When the lever is centered, all of the valves are closed.

When the lever is shifted from its centered position to one of several lateral positions the planiform face of the head engages the flange formed on the main valve member and similarly engages one of the syrup valve members, compressing the compression coil springs associated with said valve members and moving said valve members to open positions, permitting carbonated water and flavoring syrup to flow to a discharge passageway in a nozzle on the body where they are mixed and discharged from the device. When the lever is released, the compression coil springs associated with the main valve and the particular syrup valve actuated, operate to close said valves and to return the lever to its centered position. A by-pass valve is slidably received in a by-pass valve bore in the main valve member with the said by-pass valve and main valve member disposed coaxially. A compression coil spring disposed within said by-pass valve bore is normally extensible to urge the by-pass valve member upwardly into closing position. A plunger having an operating button attached thereto is slidably received within a plunger bore formed in the handle and lever. A compression coil spring disposed within said plunger bore is normally extensible to project the operating button from the end of the handle and to retract the plunger within the plunger bore to permit of closing the by-pass valve. When the operating handle of the device is in centered position, the main and syrup valves are closed, and plain carbonated water may be dispensed from the device by depressing said plunger. Movement of the operating button and the plunger causes the end of said plunger to project beyond the planiform face of the head and causes said end of the extension to contact the end of the bypass valve member, moving said by-pass valve member downwardly to a point where passageways in the by-pass valve member and in the main valve head register to permit the flow of carbonated water through the main valve head, the by-pass valve member, and the main valve tip to be discharged from the device through the nozzle.

The herein disclosed invention is shown incorporated in a beverage mixing and dispensing device similar to that described in Letters Patent No. 2,619,387 which provides a construction whereby several carbonated beverages may be mixed and served at the fountain with a single device by moving the operating handle in one of several directions. This invention provides a construction whereby the same choice of carbonated beverages is available and in addition plain carbonated water may be served without movement of the handle in any of such directions.

The invention includes a valve body 10 in which is mounted an inner main valve 11 for controlling the flow of carbonated water through the device and four syrup valves 12, 13, 14 and 15 for controlling the flow of flavoring syrup through the device. The body 10 is preferably cylindrical in form, disposed with its axis vertical, and is constructed so that the valves 11, 12, 13, 14 and 15 are arranged in directions parallel with its axis. The main valve 11 is arranged substantially in the center of said body and the syrup valves 12, 13, 14 and 15 encircle the main valve. The body 10 has a depending discharge nozzle 16 from which a stream of carbonated water mixed with syrup or plain carbonated water may be discharged into a glass. A carbonated water feed tube 17 and syrup feed tubes 18, 19, 20 and 22 are contained in a manifold 23 projecting outwardly from the body 10 and having its axis normal to the axis of said body 10. Said feed tubes 17, 18, 19, 20 and 22 are connected to reservoirs containing carbonated water and flavoring syrup to be used with the invention and which may be fed to the device by gravity or by pressure if found desirable. For operating the device a lever 24 is employed which is mounted on the body 10 and which, when moved in different directions, operates the required valves and causes a stream of any desired syrup mixed with carbonated water or plain carbonated water to flow from the nozzle.

The beverage mixing and dispensing device may be mounted in a wall 25 of a cooling cabinet 26 and is so illustrated in Fig. 1. The manifold 23 extends through the wall 25 which consists of a layer of insulating material 27 disposed between a liner 28 and an outer shell 29. A flange 30 mounted on the manifold 23 engages the outer shell 29 of the cooling cabinet 26, and a collar 32 encircling said manifold engages the liner 28. A nut 31 screwed on threads 33 formed on manifold 23, engages collar 32 and holds the manifold 23 positioned in said wall. Feed tubes 17, 18, 19, 20 and 22 are received in cavities 35, formed in the body 10 and are brazed thereto, and manifold 23 is similarly received in a cavity 21 in the body 10 and is brazed thereto. A header 40 mounted on the manifold 23 receives and supports said feed tubes 17, 18, 19, 20 and 22.

The main valve 11 includes a valve member 44 having a valve stem 42 and a valve head 45 slidably received and guided for movement in a bore 43 formed in the body 10. Said valve head is constructed with a groove 47 and in which is disposed a resilient ring 48 of any suitable flexible material. This ring engages the wall of the bore 43 and forms a fluid-tight connection for said valve member 44 when the valve is closed. Valve stem 42 is formed with a groove 49 and in which is disposed a resilient ring 50 of any suitable material. This ring engages the wall of the bore 43 and forms a fluid-tight connection for said valve stem. The bore 43 at its lower end is provided with an enlargement 51. The nozzle 16 has a cylindrical passageway 52 communicating with bore 43 and coaxial therewith. Passageway 52 opens outwardly at the bottom of the nozzle 16. The passageway 52 is formed with an enlarged portion 53 registering with the enlarged portion 51 of the bore 43 and forms therewith a mixing chamber 58 to receive the valve head 45 when the main valve 11 is opened, allowing carbonated water and syrup to pass around the valve head 45 and to be discharged from the valve. A conical valve tip 54 is disposed in continuation of the valve member 44 to facilitate the passage of the carbonated water about the valve head 45 and for the discharge of the same from the device. The valve stem 42 has a reduced section 55 and the bore 43 has an enlargement 56 at the locality of this section to provide a valve chamber 57. A passageway 59 formed in the body 10 opens into said valve chamber 57 and communicates with the carbonated water feed tube 17. The upper end of the valve member 44 is formed with a flange 60 extending outwardly thereof and providing a lower shoulder 61 and an upper shoulder 62 on said valve stem, and the upper end of bore 43 is counterbored to form a cavity 63 adapted to receive said flange 60.

For the purpose of closing the valve 11 and to center the lever 24 the following construction is used: Body 10 is formed with a recess 64 disposed adjacent the bore 43 with its axis parallel to the axis of said bore. This recess receives a compression coil spring 65 which is seated at its lower end against said body at the bottom of the recess 64 and is further seated at its other end against a sliding spring seat 66 having a socket 67 therein adapted to receive the upper end of said spring. The spring seat 66 is formed with a head 68 adapted to engage the shoulder 61 of the main valve member 44 and has a cylindrical wall 71 which is guided for movement within the recess 64. To reduce friction, the cylindrical wall 71 of the spring seat 66 intermediate the ends thereof is undercut as indicated by the reference numeral 72.

Figure 5:
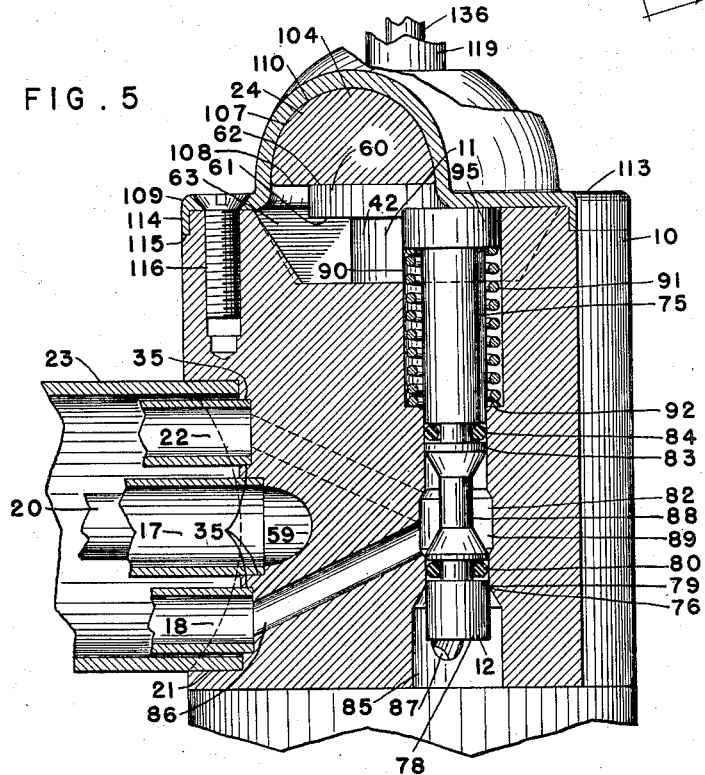
Fig. 5 is a fragmentary elevational sectional view taken on line 5—5 of Fig. 4.

The syrup valves 12, 13, 14 and 15 are identical in construction, and valve 12 will alone be described in detail. Valve 12 includes a valve member 78 having a valve stem 75 which is slidably mounted in a bore 76 formed in the body 10. Said valve member is constructed at its lower end with a groove 79 in which is disposed a resilient ring 80 of any suitable flexible material. This ring engages the wall of the bore 76 and forms a fluid-tight connection for said valve member. The valve stem 75 is likewise formed with a groove 83 and in which is disposed a resilient ring 84 of any suitable material. This ring engages the wall of the bore 76 and forms a fluid-tight connection for said valve stem. The bore 76, at the lower end of the same, is provided with an enlargement 85 which communicates with the mixing chamber 58 by means of a passageway 87. The valve member 78 is projected into enlargement 85 when the valve is opened which allows syrup to pass around said valve member. The valve stem 75 has a reduced section 88 and the bore 76 has an enlargement 82 at the locality of this section to provide a valve chamber 89. A passageway 86 formed in the body 10 and shown in Fig. 5 opens into said valve chamber and communicates with the syrup feed tube 18. The upper end of the bore 76 is enlarged to provide a section 90 of greater dimensions than the bore indicated at 76. This section of the bore receives a compression coil spring 91 which is seated at its lower end against a shoulder 92 formed at the juncture between the bore 76 and the bore section 90 and is further seated at its other end against a button 95 formed on the upper end of the valve member 78. This button is cylindrical in form and is supported and guided for movement within the bore section 90. By means of this construction, the valve member 78 is guided for vertical movement to permit of the valve member 78 being moved into the enlargement 85 of the bore 76.

Figure 2:
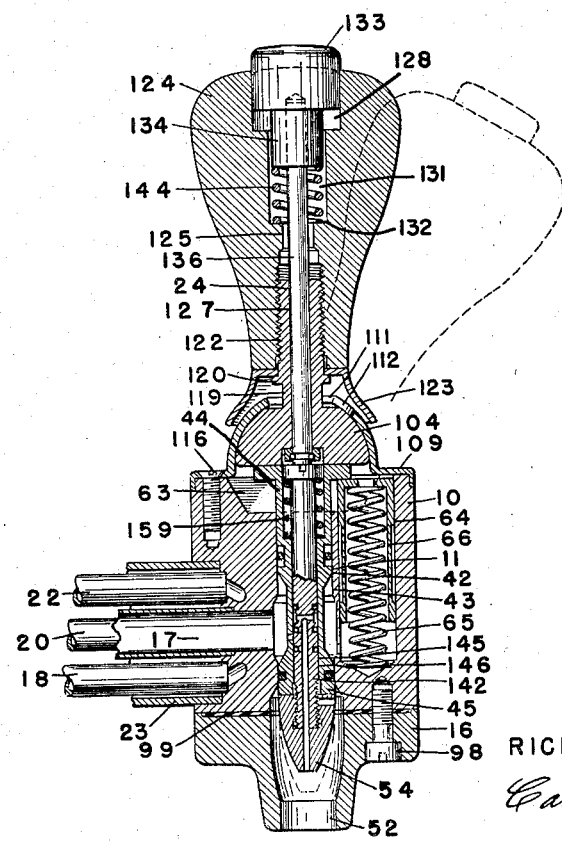
Fig. 2 is a fragmentary elevational sectional view taken on line 2—2 of Fig. 1.
Figure 3:
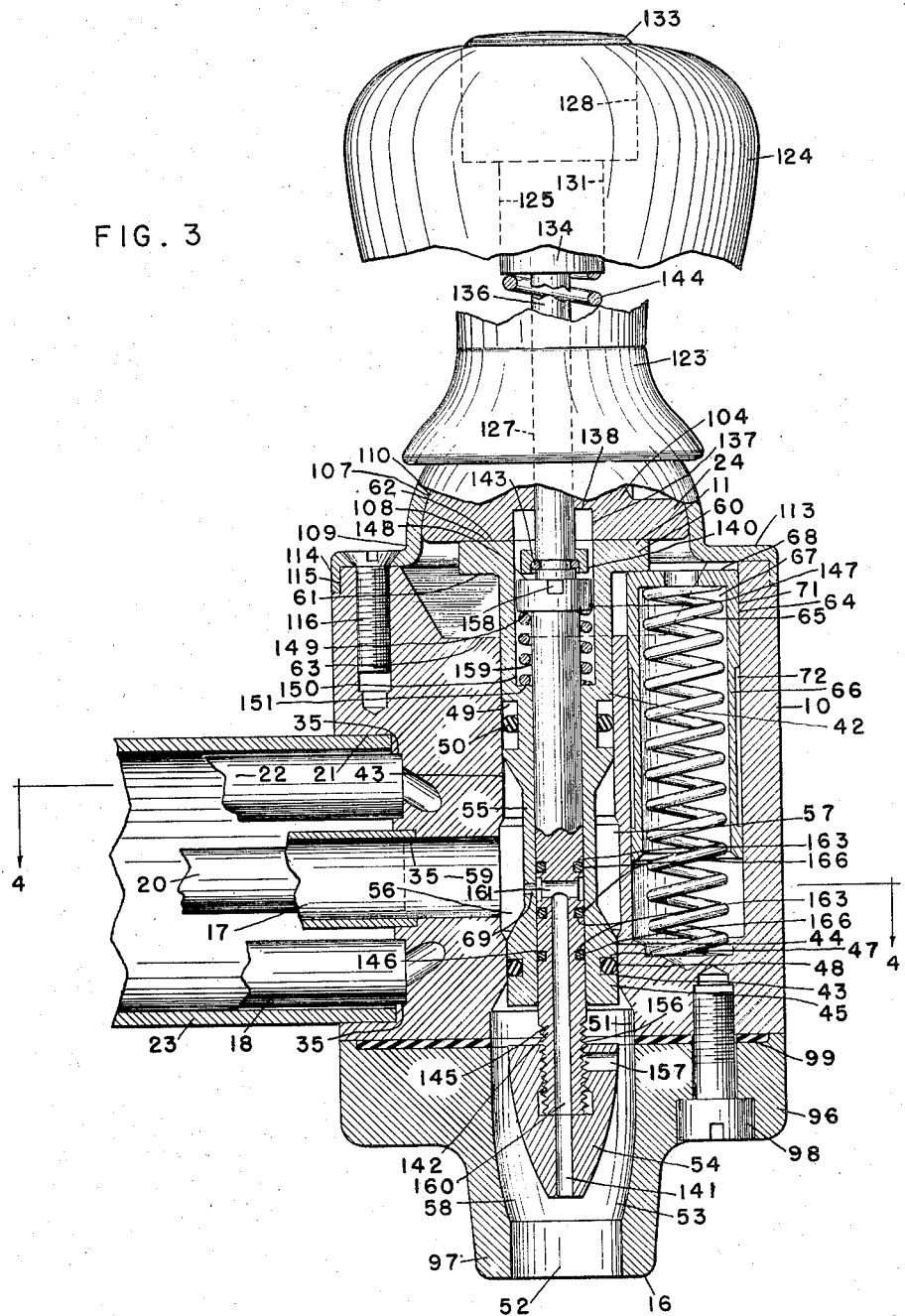
Fig. 3 is a fragmentary elevational sectional view similar to Fig. 2 and showing certain of the parts in altered position, and drawn to a greater scale.
Figure 4:
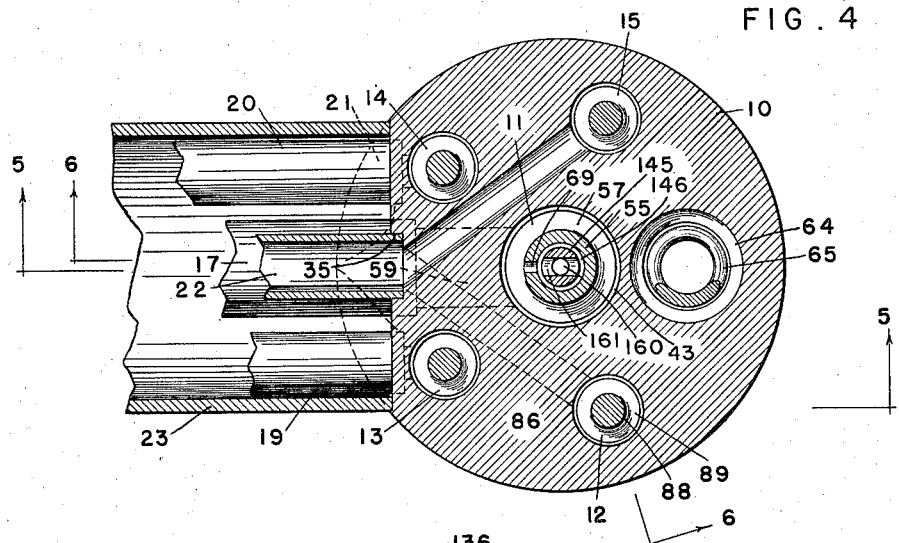
Fig. 4 is a fragmentary plan sectional view taken on line 4—4 of Fig. 3.

The nozzle 16 is cylindrical in form with a portion 96 conforming to the shape of the body and a portion 97 of lesser diameter dependent therefrom for directing the mixed beverage into a glass. The nozzle 16 is attached to the body 10 by means of a number of screws, one of which is indicated by the reference numeral 98 and shown in Figs. 2 and 3. These screws pass through the portion 96 of said nozzle and are screwed into the body 10. To prevent leakage between the body 10 and said nozzle 16, a gasket 99 is employed which is disposed therebetween.

The lever 24 has a hemispherical head 104 thereon formed with a spherical face 107 and a planiform face 108. This head is received in a hemispherical socket 110 in a cap 109 mounted on the body 10. The lever 24 extends upwardly from said head through an opening 111 in said cap having branches 112 adapted to slidably receive the lever 24 when the lever is shifted laterally from a centered position. Cap 109 has a plate-like portion 113 which rests on the upper end of the body 10 and which has a depending flange 114 received in an annular rabbet 115 formed in the upper end of the body 10. The cap 109 is attached to the body 10 by means of a number of screws, one of which is indicated by the reference character 116 and shown in Figs. 2 and 3. These screws extend through the plate-like portion 113 and are screwed into the body 10. Lever 24 is further formed with a shank 119 having a flange 120 extending outwardly therefrom and is also formed with a threaded portion 122 extending beyond said flange. A skirt 123 is seated on the flange 120 of the lever 24 and extends downwardly to cover the openings 111 in the cap 109. A handle 124 having a threaded bore 125 axially formed therein is screwed on the threaded portion 122 of the lever 24, to draw the handle 124 against the skirt 123 thus clamping the parts together. Lever 24 is formed with a bore 127 extending axially therethrough and lying in continuation of the bore 125 formed in the handle 124. Bore 125 of the handle 124 is provided with a recess 128 opening outwardly of said handle 124. An enlarged portion 131 of said bore 125 lies inwardly of the recess 128 and forms a shoulder 132 between said recess and bore 125. A plunger 136 is received in the bore 125 of the handle 124 and the bore 127 of the lever 24. Mounted on the plunger 136 is a spring seat 134 and acting between it and the shoulder 132 is a compression coil spring 144 encircling the plunger 136 and disposed within the enlarged portion 131 of the bore 125 of handle 124. The head 104 is provided with a counter bore 137 opening outwardly of the bore 127 at its lower end to provide a shoulder 138. A collar 140 encircles said plunger 136 at its lower end and is retained thereon by means of a snap-ring 143. This collar is received in the counter bore 137 and limits upward movement of the plunger. An operating button 133 on the end of plunger 136 is disposed in the recess 128 and normally projects outwardly of the handle 124 where the same is readily accessible.

Plain carbonated water may be served without movement of the handle 124 by means of the following construction: For the purpose a by-pass valve 142 is employed which includes a valve member 145 which is slidably received and guided for movement in a bore 146 which is formed in the main valve member 44 and which extends axially therethrough. The by-pass valve member 145 is constructed at its upper end with a flange 147 extending outwardly thereof, forming an upper shoulder 148 and a lower shoulder 149. Said flange 147 is slidably received and guided for movement in a counter bore 150 formed in the main valve stem 42 and opening outwardly thereof at its upper end. This counter bore provides a shoulder 151 with the bore 146. The by-pass valve member 145 is formed with threads 156 at its lower end, and the valve tip 54 is threaded to engage said threads. A recess 157 is formed in the valve tip 54 to receive the stud of a spanner wrench, and a slot 158 is formed in the flange 147 to receive the blade of a screw driver to be used in the assembly of the valve tip 54 and the by-pass valve member 145. The by-pass valve member 145 is urged upwardly by means of a compression coil spring 159 which encircles said by-pass valve member and is disposed within the counter bore 150 formed in the main valve stem 42. One end of said spring is seated against the shoulder 151 formed in the main valve stem 42 and the other end is seated against the shoulder 149 on the by-pass valve 142. A transverse passageway 69 in the reduced section 55 of the main valve stem 42 opens outwardly into the valve chamber 57 and is adapted to communicate at its other end with a circumferential groove 162 formed in the by-pass valve member 145. An axial passageway 160 formed in the by-pass valve member 145 communicates with a transverse passageway 161 formed in said by-pass valve member and communicating with the circumferential groove 162 therein. A passageway 141 axially formed in the valve tip 54 forms a continuation of the passageway 160 in the by-pass valve member 145 and opens outwardly of said valve tip into the mixing chamber 58, providing a liquid conduit from the valve chamber 57 through passageway 69 to the circumferential groove 162, through passageways 161, 160 and 141 and into said mixing chamber when the by-pass valve is open. By-pass valve member 145 is formed with grooves 163 which receive resilient sealing rings 166 to prevent leakage of the carbonated water past the same.

In operation, the lever 24 of the device is centered in the opening 111 of the cap 109 when the device is in disuse, and all of the valves are closed. When the lever 24 is shifted from a centered position along one of the branches 112 of the opening 111 of the cap 109, the planiform face 108 of the head 104 in engagement with the shoulder 62 of the flange 60 formed on the main valve member 44 and with the button 95 of the syrup valve member 78 is tilted in relation to the axis of the valve body 10 to cam the main valve flange and the valve member 44 downwardly, and the button 95 and the syrup valve member 78 downwardly. The button 95, being in engagement with the compression coil spring 91 associated with said syrup valve, compresses said spring and moves the syrup valve member 78 into the enlargement 85 formed in the syrup valve bore 76, permitting syrup from the feed tube 18 in the manifold 23 to flow into the valve chamber 89 in the bore 76, past said syrup valve member and through the passageway 87 to the mixing chamber 58 in the main valve bore 43. On movement of the flange 60 formed in the main valve member 44, the shoulder 61 of said flange being in engagement with the head 68 of the spring seat 66, moves said spring seat downwardly in the recess 64 and compresses the main valve spring 65. Movement of the flange 60 of main valve member 44 moves the main valve head 45 into the enlargement 51 formed in the main valve bore 43, permitting carbonated water from the feed tube 17 in the manifold 23 to flow into the valve chamber 57 in the bore 43, past said main valve head, and into the mixing chamber 58, where it is mixed with the syrup and is discharged from the device through the passageway 52 in the nozzle 16. When the lever 24 is released, springs 65 and 91 return the same to its centered position in the opening 111 of the cap 109, the planiform face 108 of the head 104 being restored to a position normal to the axis of the body 10. When the main valve member 44 is moved upward in the bore 43, the resilient ring 48 in the main valve head 45 is brought into engagement within the bore 43 to close the main valve and terminate the flow of carbonated water. The syrup valve member 78 is likewise urged upwardly in the bore 76 by extension of the spring 91 to close the syrup valve. With the lever 24 in the centered position, plain carbonated water unmixed with syrup may be dispensed from the device by depressing the operating button 133 which moves the plunger 136 downwardly to operate the by-pass valve member 145 to open valve 142. When the by-pass valve member 145 moves downwardly, the flange 147 compresses the spring 159 and positions the transverse passageway 161 in said by-pass valve member to register with the passageway 69 formed in the main valve stem 42, permitting carbonated water to flow through the by-pass valve member 145, to be discharged from the by-pass valve 142 into the mixing chamber 58, from which it is delivered to the beverage glass through the passageway 52 in the nozzle 16. When the operating button 133 is released, the spring 159 engaging the flange 147 formed on the by-pass valve member 145 extends to urge said by-pass valve member upwardly in the bore 146 and to position the flexible seal 166 between said transverse passageway and the passageway 69 in the main valve stem 42, to close the by-pass valve 142 to the flow of carbonated water from the passageway 69. Movement of the by-pass valve member 145 upwardly in the bore 146 is limited by the valve tip 54 which engages the main valve head 45. The operating button 133 and the plunger 136 are urged upwardly in the bores 125 and 127 by extension of the spring 144 which is in engagement with said operating button. This movement of the operating button 133 and of the plunger 136 is limited by the collar 140 which engages the shoulder 138 formed in the head 104.

The advantages of the device are manifest. The device may be incorporated in a beverage mixing and dispensing device without affecting its existing functions. The device is simple and practical in operation. The construction is readily adapted to machine production. By removing the screws which retain the cap, the lever and its associated parts may be removed from the device as a unit, permitting access to the main valve, the syrup valves and the passageways for repair or cleansing without dismounting the body. With the lever and its associated parts removed from the device, any of the valves may be removed for repair or cleansing of such valves or their associated passageways without disturbing the remaining valves. Passageways incorporated in the construction have straight bores having few changes in direction of fluid flow, and all passageways are accessible for cleaning without the use of special tools or removal of the body from its mounting. The disposition of the main valve coil compression spring offset from the main valve member makes possible the use of a main valve member having a diameter sufficiently large to accommodate an integral by-pass valve disposed axially therein.

Changes in the specific form of the invention, as herein described, may be made within the scope of what is claimed without departing from the spirit of the invention.

Having described the invention, what is claimed as new and desired to be protected by Letters Patent is:

1. In a beverage mixing and dispensing device having a body and main valve for controlling the flow of carbonated water through said body, said main valve including a slidable main valve member having a valve tip disposed at the end thereof, said body having a bore in which said main valve member is guided for movement, the combination of a carbonated water by-pass valve, said by-pass valve being carried by the main valve member and having a by-pass valve member with a shoulder formed thereon, said main valve member having a bore therein slidably receiving and guiding said by-pass valve member, and a by-pass valve spring encircling said by-pass member and disposed within the bore of said main valve member in engagement with said main valve member and with said shoulder on the by-pass member, said valve tip being detachably connected to said by-pass valve member and serving to control the flow of liquid from the main valve, to limit movement of the by-pass valve with respect to the end of the main valve member bore, and to retain said by-pass valve member and by-pass valve spring within the main valve member bore, said valve tip on detachment from said by-pass valve member freeing said by-pass valve member and by-pass valve spring for removal from said main valve member, and manually operable means for actuating said by-pass valve independently of said main valve.

2. In a dispensing device having a body and a main valve for controlling the flow of the liquid dispensed through the body, said main valve including a slidable main valve member, said body having a bore therein in which said main valve member is guided for movement, a by-pass valve having a by-pass valve member carried by the main valve member, said main valve member having a bore therein slidably receiving the guiding said by-pass valve member for movement in the same direction as said main valve member, resilient means acting on said main valve member and holding it normally closed, resilient means acting on said by-pass valve member and holding it normally closed, a lever coaxially disposed relative to said main valve member, pivot means acting between said lever and body and guiding said lever for swinging movement, out of alignment with said main valve member, means acting between said lever and main valve member and upon swinging of said lever procuring sliding movement of said main valve member to open the main valve against the action of said first named resilient means, said lever having a bore therein coaxial with the by-pass valve member when the lever is in normal position, a plunger slidable in the bore in said lever and engaging said by-pass valve member and means on said plunger disposed during disuse outwardly of said lever for manual engagement to actuate the by-pass valve member.

3. In a dispensing device having a body and a main valve for controlling the flow of the liquid dispensed through the body, said main valve including a slidable main valve member, said body having a bore therein in which said main valve member is guided for movement, a by-pass valve having a by-pass valve member carried by the main valve member, said main valve member having a bore therein slidably receiving and guiding said by-pass valve member for movement in the same direction as said main valve member, resilient means acting on said main valve member and holding it normally closed, resilient means acting on said by-pass valve member and holding it normally closed, a lever coaxially disposed relative to said main valve member, means forming a socket in said body, a spherical shaped head on said lever mounted in said socket and guiding said lever for movement out of alignment with said main valve member, means on said lever engaging said main valve member and reciprocating the same against the action of said first named resilient means to open the main valve upon swinging movement of said lever, said lever having a bore therein coaxial with the by-pass valve member when the lever is in normal position, a plunger slidable in the bore in said lever and engaging said by-pass valve member substantially at the center of said head and means on said plunger disposed during disuse outwardly of said lever for manual engagement to actuate the by-pass valve member.

4. In a liquid dispensing device having a body, a main valve having a main valve member for controlling the flow of the liquid dispensed through said body, said body having a bore in which said main valve member is guided for movement, and a lever for actuating said main valve pivotally mounted on said body, said lever having a bore therein, a by-pass valve including an axially reciprocal by-pass valve member slidably mounted in the bore in said main valve member, and manually operable means for operating said by-pass valve member, including a plunger slidably mounted in the bore in said lever, the inner end of said plunger engaging said by-pass valve member when the main valve member is in closing position, means on said plunger disposed during disuse outwardly of said lever for manual engagement to actuate the by-pass valve member.

References Cited in the file of this patent

UNITED STATES PATENTS

| | | |
|---|---|---|
| 1,005,409 | Bruns | Oct. 10, 1911 |
| 1,152,114 | Luitwieler | Aug. 31, 1915 |
| 1,506,434 | Leins | Aug. 26, 1924 |
| 1,605,399 | Fornaca | Nov. 21, 1926 |
| 2,201,752 | Winberg | May 21, 1940 |
| 2,563,484 | Ojalvo | Aug. 7, 1951 |
| 2,619,387 | Cornelius | Nov. 25, 1952 |

FOREIGN PATENTS

| | | |
|---|---|---|
| 114,971 | Germany | of 1900 |
| 275,916 | Switzerland | of 1951 |